United States Patent [19]

Vlasicak

[11] Patent Number: 5,139,278
[45] Date of Patent: Aug. 18, 1992

[54] VERSATILE FUEL CONTAINER

[76] Inventor: Lewis J. Vlasicak, 3316 Northridge Dr., Clearwater, Fla. 34621

[21] Appl. No.: 751,515

[22] Filed: Aug. 29, 1991

[51] Int. Cl.$^5$ ............................................. B62B 1/10
[52] U.S. Cl. ............................ 280/47.26; 280/47.33; 220/86.1; 222/608
[58] Field of Search ............... 280/47.24, 47.26, 47.33, 280/79.2, 7, 782, 783, 836; 220/86.1, 86.2, 601, 661; 222/185, 481, 608

[56] References Cited

U.S. PATENT DOCUMENTS

| 2,384,174 | 9/1945 | Jones | 280/47.26 X |
| 3,865,270 | 2/1975 | Petersson | 220/86.1 X |
| 4,607,857 | 8/1986 | LeSage et al. | 280/47.33 X |
| 4,635,950 | 1/1987 | LeSage et al. | 280/47.26 |
| 4,778,191 | 10/1988 | Heisson | 280/47.26 |
| 4,877,261 | 10/1989 | Heisson | 280/47.26 |
| 5,069,385 | 12/1991 | Färber | 220/661 X |

FOREIGN PATENT DOCUMENTS 1016999 11/1952 France ................ 280/47.26
577378 5/1958 Italy ................... 220/86.1

Primary Examiner—Andres Kashnikow
Assistant Examiner—Brian L. Johnson
Attorney, Agent, or Firm—Stanley M. Miller

[57] ABSTRACT

A twenty five gallon fuel container has wheels and a handle to facilitate its transporation over a support surface. A trailing tangential point on the wheels is in vertical alignment with a trailing edge of the handle so that when the container is laid down on its back, its front and back walls are parallel to the ground. A vented fill spout is mounted at a forty five degree angle relative to both the front wall and a top wall of the container so that the fill spout is disposed forty five degrees relative to the ground when the container is upright and when the container is in its reclining position. Thus, fuel cannot spill when the container is in either position. Indentations formed in the container strengthen it and provide a place to position hold down straps when the container is strapped in position aboard a vehicle.

6 Claims, 3 Drawing Sheets

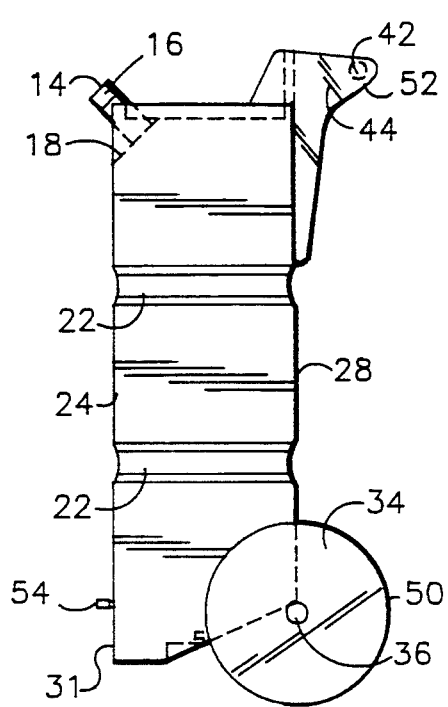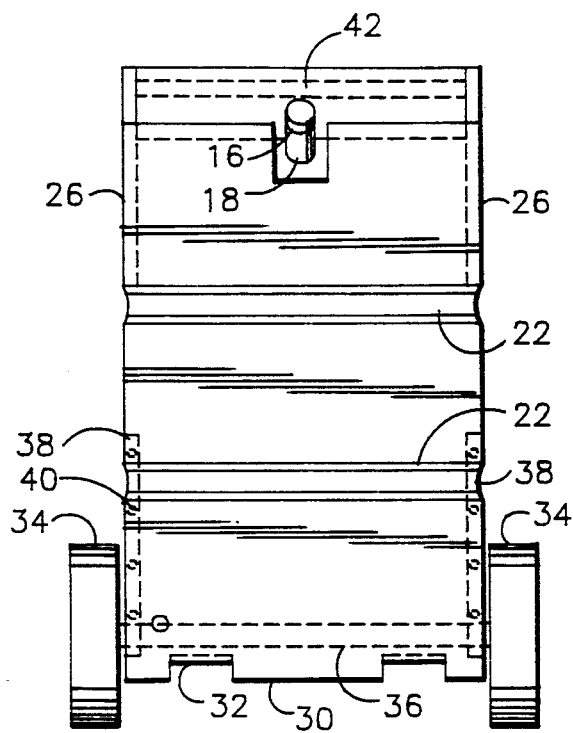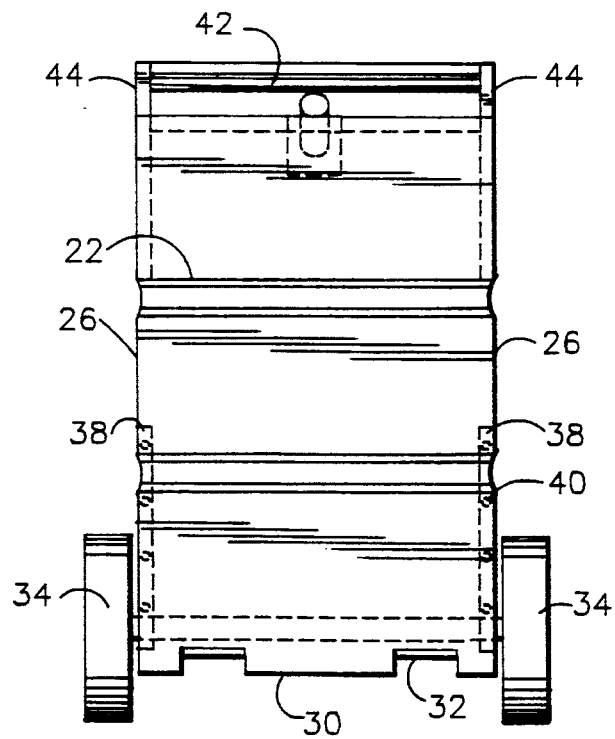
FIG.2
FIG.3
FIG.4

VERSATILE FUEL CONTAINER

BACKGROUND OF THE INVENTION

1. Field of the Invention

This invention relates, generally, to fuel containers having utility in the boating industry. More particularly, it relates to a gravity flow container that may be stored in an upright or reclining position without spilling fuel.

2. Description of the Prior Art

Boats have large fuel tanks; where six gallon cans are used to fill them, numerous charging operations are required. Moreover, boats consume large quantities of fuel; thus, even large boats with large fuel tanks often have a cruising range that is unacceptably short.

Conventional fuel containers are not only too small, they must be carefully handled to avoid spillage. For example, they must be maintained in an upright position when being transported from a gas station to a dock; they also must remain in an upright position when stored on board so that the fuel they contain may be used to extend the length of a trip.

However, when the prior art is considered as a whole, it is not readily apparent to those of ordinary skill, how a better fuel container could be provided.

SUMMARY OF THE INVENTION

The present invention provides a large, twenty five gallon fuel container that is easy to use and which may be transported in an upstanding or horizontal configuration without fear of spilling its contents.

The novel container includes a housing having a parallelpiped construction. A pair of laterally spaced pneumatic wheels facilitate its transportation over a support surface so that it need not be carried. However, hand holds are formed in the bottom of the container so that it may be carried or lifted as needed. A vented fill cap is provided at the top of the housing and is advantageously disposed at a forty five degree angle so that fuel cannot spill therefrom when the container is in its upright position. A handle is aligned vertically above the wheels so that the container may be transported like a cart and so that the container can also be placed into a horizontal position; the forty five degree angle of the fill spout prevents fuel spillage when the container is so disposed.

Strengthening indentations are formed on the housing as well and perform not only a strengthening function but also serve to position hold-down straps when the container is being transported.

A primary object of the present invention is to provide a large capacity fuel container that is easy to handle, that is safe to transport, and that lengthens the cruising range of boats.

Another important object is to provide a fuel container that may be transported either vertically or horizontally without fear of fuel spillage.

These and other important objects, advantages, and features of the invention will become apparent as this description proceeds.

The invention accordingly comprises the features of construction, arrangement of parts, and combination of elements that will be set forth hereinafter, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, wherein:

FIG. 2 is a side elevational view thereof;

FIG. 3 is a front elevational view thereof;

FIG. 4 is a rear elevational view thereof;

Similar reference numerals refer to similar parts throughout the several views of the drawings.

DETAILED DESCRIPTION OF THE PREFERRED EMBODIMENT

Figure 1:
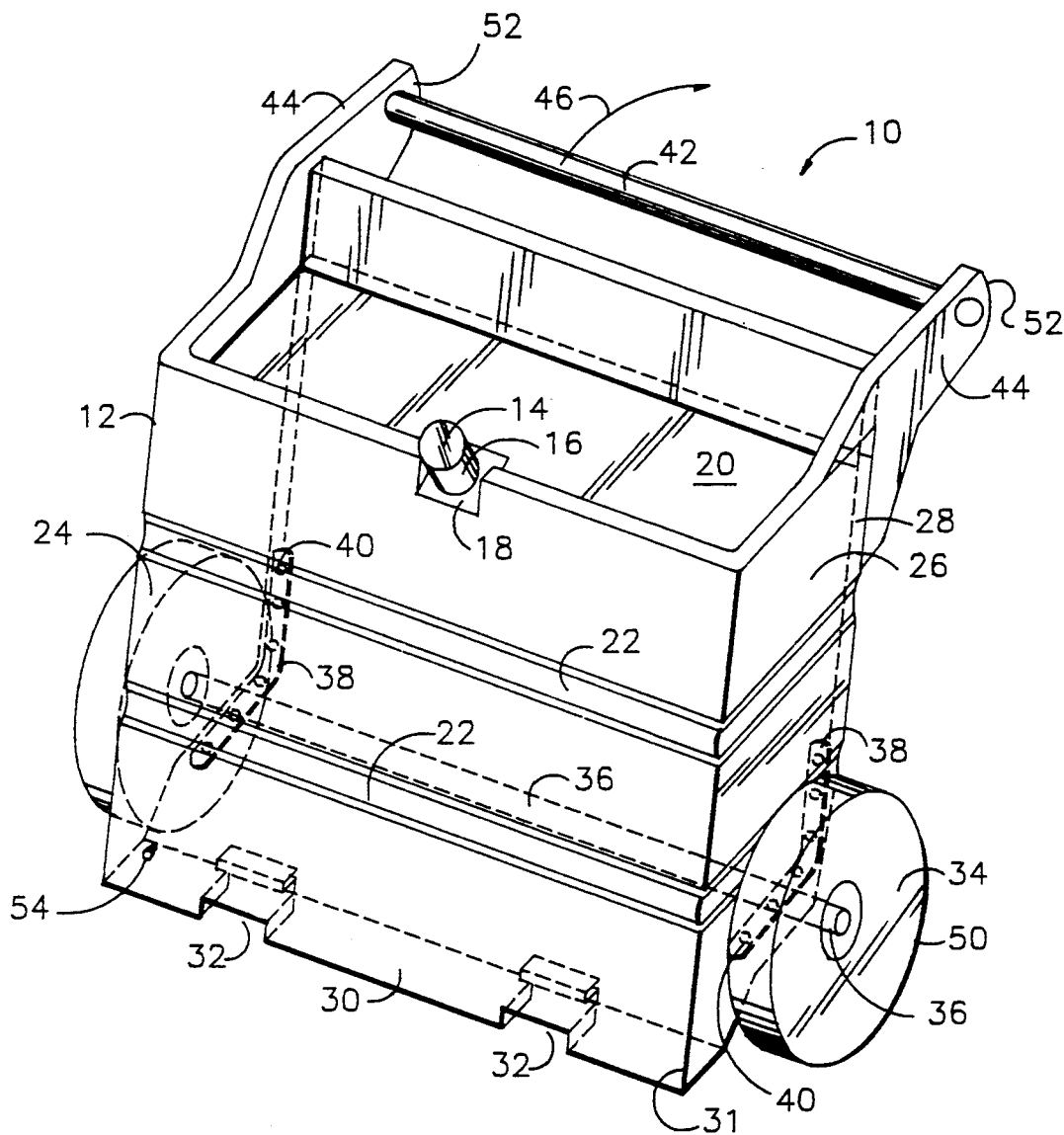
FIG. 1 is a perspective view of an illustrative embodiment of the invention.
Figure 5:
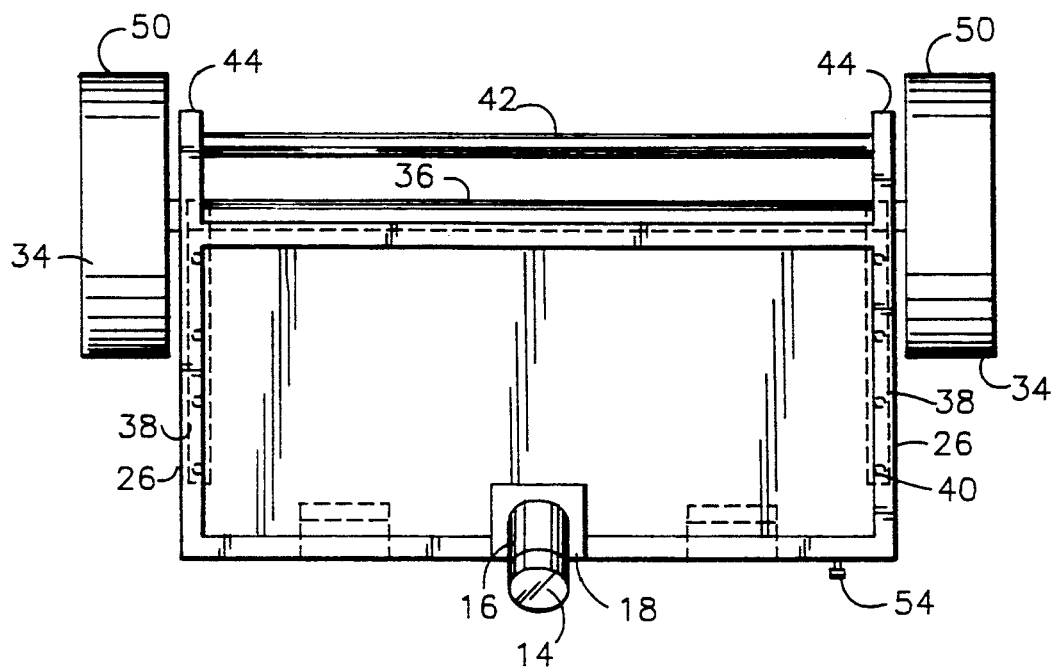
FIG. 5 is a top elevational view thereof.
Figure 6:
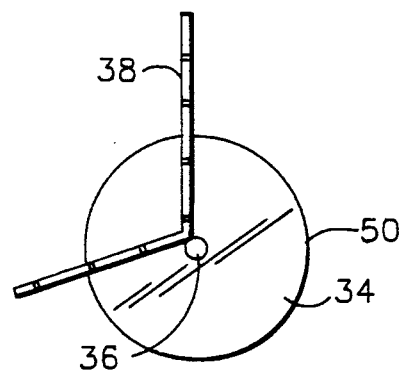
FIG. 6 is a detailed side elevational view of the wheel assembly.

Referring now to FIG. 1, it will there be seen that an exemplary embodiment of the invention is denoted as a whole by the reference numeral 10.

Container 10 includes a hollow housing 12 of parallelpiped construction; although it may be provided in a variety of sizes, it preferably has a capacity of twenty five gallons.

Vented fill cap 14 provides a closure means for spout 16; note that sloped wall 18 upon which the spout is mounted is sloped at a forty five degree angle relative to the horizontal and to the vertical. Spout 16 is upright with respect to sloped wall 18, i.e., it is orthogonally disposed with respect to said support wall.

Flat, imperforate surface 20 is the top wall of the housing 12 and serves as a tray upon which may be stored tools or other convenient items.

In addition to top wall or tray 20, housing 12 further includes front wall 24, side walls 26, back wall 28 which is parallel to front wall 24, and bottom wall 30. Sloped wall 18 is formed where front wall 24 and top wall 20 intersect one another. As perhaps best shown in FIG. 2, bottom wall 30 has a downward and forward slope relative to back wall 28, and said bottom wall further includes a level forward part denoted 31.

A pair of laterally spaced apart hand holds or recesses 32 are formed in bottom wall 30; they perform the function their name expresses, i.e., they facilitate lifting of container 10.

Although hand holds 32 provide a facile means for lifting the container 10, means are provided to reduce the need to lift it because it may be quite heavy when full due to its twenty five gallon capacity. A pair of laterally spaced wheels 34 are mounted on axle 36, and axle 36 is mounted for rotation relative to brackets 38 which are laterally spaced apart at opposite ends of said axle 36. Brackets 38 are secured by suitable means 40 to the back or rear wall 28 and bottom wall 30 of container 10 so that axle 36 is positioned at the lower end of rear wall 28. A transversely disposed handle 42 has its opposite ends mounted in mounting ears 44 that are integral with side walls 26 and which project upwardly and rearwardly therefrom. Thus, container 10 is easily transported over a support surface by tilting handle 42 in the direction of arrow 46 (FIG. 1); this tilting lifts the level part 31 of bottom wall 30 from the support surface so that wheeled transportation of container 10 is easily accomplished.

It should also be observed that the slope of bottom wall 30 is such that container 10 is upright when level part 31 of said bottom wall is resting on a support surface, as depicted in FIG. 1. Moreover, it should be observed that the rear edge or tangential point 50 of each wheel 34 is in substantial vertical alignment with the rear or trailing edge 52 of each handle-mounting ear 44; thus, if tilting of handle 42 is continued in the direction of arrow 46, when mounting ears 44 abut the support surface, front wall 24 and rear wall 28 will be parallel to that support surface. Significantly, the angle of spout 16 will still be forty five degrees from the vertical or horizontal when the container 10 has been placed into said horizontal position. Thus, no spillage occurs regardless of the upright or horizontal position of the novel container.

Indentations 22 encircle the housing 12 and strengthen it. They also provide means for holding straps in place when straps are employed to hold the container in a fixed position. Although two parallel indentations are depicted, one or more than two indentations may be provided. When two indentations are provided, they divide housing 12 into three equal sized sections as shown and as such enhance the aesthetic appeal of the device.

Fitting 54 at the lower left corner of FIG. 1 protrudes from front wall 24 at a ninety degree angle. It is provided with antiretraction barbs or ferrules so that a hose attached thereto cannot come off inadvertently. Due to the vent in the fill cap 14, said cap 14 need not be removed when a hose is attached to said fitting 54 to perform a fuel charging operation. The placement of the reversely barbed fitting just above bottom wall 30 at a corner of the container 10 makes it easy to completely empty the container by tilting it at an angle towards said fitting as the container nears empty. A butterball or other suitable valve is employed to prevent leakage of fuel through the fitting when the hose is not in use.

The gravity flow design facilitates the charging of fuel into a boat's fuel tank from a dock. The convenience provided by the novel container, together with its ease of manufacture and concomitant affordability, ensures its acceptance in the marketplace.

This invention is clearly new and useful. Moreover, it was not obvious to those of ordinary skill in the art at the time it was made, in view of the prior art when considered as a whole in accordance with the requirements of law.

It will thus be seen that the objects set forth above, and those made apparent by the preceding description, are efficiently attained and since certain changes may be made in the above construction without departing from the scope of the invention, it is intended that the claims that follow are to be interpreted in an illustrative and not in a limiting sense.

It should also be understood that the claims that follow are intended to cover the generic and specific features of the invention and all matters that, as a matter of language, might be said to fall therebetween.

Now that the invention has been described,
What is claimed is:

1. A fuel container, comprising:
   a housing having a generally parallelepiped construction;
   said housing including a front wall, a back wall parallel to said front wall, a pair of side walls, a top wall and a bottom wall that is sloped downwardly and forwardly relative to said back wall;
   said housing further including a sloped wall formed at a preselected location where said front wall and top wall intersect one another;
   said sloped wall being disposed at a forty five degree angle relative to said front wall and said top wall;
   a fill spout disposed in orthogonal relation to said sloped wall so that said fill spout is disposed at a forty five degree angle relative to said front wall and said top wall;
   a vented fill cap for closing said fill spout;
   an axle rotatably mounted to a lower end of said back wall;
   a wheel disposed at each end of said axle;
   each of said side walls further including an integral ear that projects upwardly and rearwardly from the associated side wall;
   a handle member mounted between said ears;
   each wheel having a trailing tangential point that is in vertical alignment with a trailing edge of said handle when said container is in a stable upright position;
   said front wall and back wall being parallel to a support surface when said container is supported by said wheels and said handle providing a stable reclining position;
   whereby said container prevent fuel spills when filled with fuel and when in either one of said upright position and said reclining position due to the forty five degree orientation of said fill spout and the vertical alignment of said wheels and handle.

2. The container of claim 1, further comprising a pair of recesses formed in said bottom wall, said recesses adapted to be engaged by a human hand to provide hand holds for lifting said container as needed.

3. The container of claim 2, further comprising a pair of parallel indentations that encircle said container, said indentations strengthening said container and providing positioning means for positioning hold down straps when the container is being transported.

4. The container of claim 3, further comprising a fitting positioned in said front wall just above said bottom wall, said fitting adapted to releasably engage a hose and said fitting further including a valve so that when said hose is engaged to said fitting and said valve is opened, fuel in said container may flow through said hose under the influence of gravity.

5. The container of claim 4, wherein said fitting is reversely barbed to defeat facile disconnection of said hose therefrom.

6. The container of claim 5, wherein said fitting is disposed in a corner of said front wall to facilitate complete emptying of said container.

* * * * *